(12) United States Patent
Schumann et al.

(10) Patent No.: US 12,277,719 B2
(45) Date of Patent: Apr. 15, 2025

(54) MULTISPECTRAL MICROSCOPE SYSTEM AND METHOD FOR REGISTERING FIRST AND SECOND IMAGES BY MEANS THEREOF

(71) Applicant: Leica Microsystems CMS GmbH, Wetzlar (DE)

(72) Inventors: Christian Schumann, Lich (DE); Kai Ritschel, Heuchelheim (DE); Mate Beljan, Oberursel (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 406 days.

(21) Appl. No.: 17/676,318

(22) Filed: Feb. 21, 2022

(65) Prior Publication Data

US 2022/0284604 A1 Sep. 8, 2022

(30) Foreign Application Priority Data

Mar. 5, 2021 (EP) ..................................... 21161036

(51) Int. Cl.
*G06T 7/32* (2017.01)
*G02B 21/16* (2006.01)
(Continued)

(52) U.S. Cl.
CPC ................ *G06T 7/32* (2017.01); *G02B 21/16* (2013.01); *G02B 21/365* (2013.01); *G06T 5/80* (2024.01); *G06T 2207/10056* (2013.01); *G06T 2207/10064* (2013.01); *G06T 2207/20212* (2013.01); *G06T 2207/30108* (2013.01)

(58) Field of Classification Search
CPC ............. G06T 7/32; G06T 2207/10064; G06T 2207/10056–10061; G02B 21/00–368
See application file for complete search history.

(56) References Cited

U.S. PATENT DOCUMENTS 4,805,123 A * 2/1989 Specht .................... G06T 7/001
356/394
6,650,412 B1 * 11/2003 Slater .................... G01J 3/0286
356/328

(Continued)

FOREIGN PATENT DOCUMENTS

CN 110298870 A * 10/2019 ................ G01J 5/00
EP 1389956 A2 2/2004
(Continued)

*Primary Examiner* — Utpal D Shah
*Assistant Examiner* — Jack Peter Kraynak
(74) *Attorney, Agent, or Firm* — LEYDIG, VOIT & MAYER, LTD.

(57) ABSTRACT

A multispectral microscope system includes a first detector element for capturing a first image of a sample in a first spectral channel, and at least a second detector element for capturing a second image of the sample in a second spectral channel. The first detector element includes a first detector array. The second detector element includes a second detector array different from the first detector array. The microscope system further includes a processor for determining a spatial correlation between the first and second images based on a spectral crosstalk between the first and second spectral channels and registering the first and second images based on the spatial correlation.

18 Claims, 2 Drawing Sheets

(51) Int. Cl.
*G02B 21/36* (2006.01)
*G06T 5/80* (2024.01)

(56) References Cited

U.S. PATENT DOCUMENTS

| | | | |
|---|---|---|---|
| 9,681,043 B2* | 6/2017 | Chen | H04N 23/52 |
| 10,949,987 B2* | 3/2021 | Liu | G06T 7/32 |
| 2006/0198558 A1* | 9/2006 | Riley | G01J 3/28 |
| | | | 382/294 |
| 2011/0268347 A1* | 11/2011 | Staker | G06V 10/32 |
| | | | 506/38 |
| 2014/0193061 A1* | 7/2014 | Miller | G06T 7/0012 |
| | | | 382/133 |
| 2018/0270474 A1* | 9/2018 | Liu | G06T 7/30 |
| 2019/0114791 A1* | 4/2019 | Saquib | H04N 23/11 |
| 2020/0193580 A1* | 6/2020 | McCall | G06T 7/62 |

FOREIGN PATENT DOCUMENTS

| | | | | |
|---|---|---|---|---|
| EP | 2538262 A2 * | 12/2012 | | G02B 21/16 |
| WO | WO-2019110567 A1 * | 6/2019 | | G06T 7/0012 |

\* cited by examiner

MULTISPECTRAL MICROSCOPE SYSTEM AND METHOD FOR REGISTERING FIRST AND SECOND IMAGES BY MEANS THEREOF

CROSS-REFERENCE TO PRIOR APPLICATION

Priority is claimed to European Patent Application No. EP 21161036.5, filed on Mar. 5, 2021, the entire disclosure of which is hereby incorporated by reference herein.

FIELD

The invention relates to a multispectral microscope system. The invention further relates to a method for registering first and second images by means of a multispectral microscope system.

BACKGROUND

Multispectral microscope systems generate multispectral images of a sample by superimposing images of the sample captured in different spectral channels. Superimposing images obtained from different measurements requires image registration. This process can be understood as transforming the images into a common coordinate system.

In particular, if the detection arrangement of a multispectral microscope system comprises different detectors, mechanical misalignment between the detectors, may occur between individual measurements, e.g. due to thermal expansion of mechanical components coupling the different detectors, which is also called drift. This drift makes it necessary to determine the transformation for registering the images captured by the different detectors on-line, i.e. during the actual measurement.

A number of methods for registering images by means of a multispectral microscope system are known that either rely on the use of a reference sample or predetermined parameters in order to determine the transformation for registering the images. However, since these known methods rely on an explicit calibration step, performed either before the measurement or during manufacturing, none of these methods can account for drift occurring during the actual measurements of the sample.

Alternatively, drift can be minimized by an athermal design of the detector arrangement, e.g. by using invar or other materials with low degree of thermal expansion. However, these materials are expensive and difficult to machine and process, which leads to a significant increase in manufacturing costs. Further, athermal designs have to be thoroughly tested leading to longer development and testing times as well.

SUMMARY

In an embodiment, the present invention provides a multispectral microscope system, comprising: a first detector element configured to capture a first image of a sample in a first spectral channel; at least a second detector element configured to capture a second image of the sample in a second spectral channel; and a processor configured to determine a spatial correlation between the first and second images based on a spectral crosstalk between the first and second spectral channels and to register the first and second images based on the spatial correlation.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
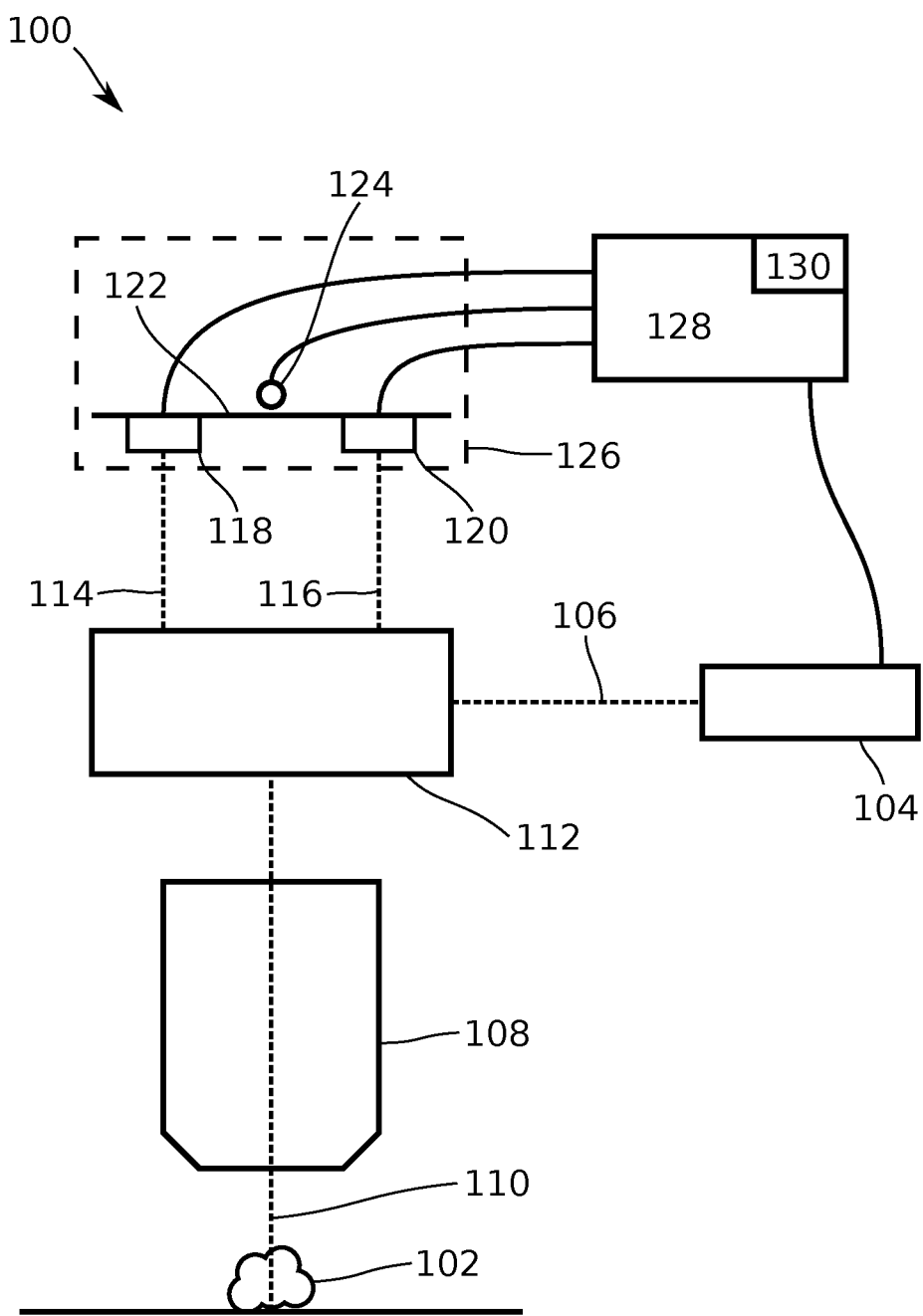
FIG. 1 is a schematic diagram of a multispectral microscope system.

In an embodiment, the present invention provides a multispectral microscope system and a method for registering first and second images that are capable of accounting for drift occurring during the actual measurements of a sample.

The proposed multispectral microscope system comprises a first detector element configured to capture a first image of a sample in a first spectral channel, at least a second detector element configured to capture a second image of the sample in a second spectral channel, and a processor configured to determine a spatial correlation between the first and second images based on a spectral crosstalk between the first and second spectral channels and to register the first and second images based on the spatial correlation.

In particular, the first and second detector elements each comprise a detector array, e.g. a CCD- or CMOS-element, that is configured to capture two-dimensional images.

The first and second images are captured in different spectral channels. In other words, the first and second images exhibit different bands of the electromagnetic spectrum emitted by the sample. Spectral crosstalk may either be caused by partially overlapping emission spectra, so called emission crosstalk, or due to fact that the spectral channels at least in part overlap. Due to the spectral crosstalk, there is image data which is present in both images. By determining a spatial correlation between both images, parts of the first and second images are identified that represent the same image data. This information is then used to determine a positional relationship between the first and second images in the image plane, and thus to determine a transformation that transforms both images into a common coordinate system, i.e. registers the first and second images.

In a typical multispectral microscope system having a widefield detection unit, i.e. a detection unit comprising a sensor array, the image side numerical aperture is generally low, e.g. 0.05. Thus, for visible wavelengths the diffraction-limited lateral sampling is about 2.5 µm, whereas the depth of focus is about 200 µm. This means that such a system is by a factor of about 100 more sensitive to shifts in the image plane than to axial shifts, and it is therefore sufficient to determine the relative position of the first and second images in the image plane in order to register the images.

The proposed multispectral microscope system uses the first and second images themselves in order to determine the transformation for registering the images. Thereby, the need for an explicit calibration step is eliminated. Further, drift that occurs during subsequent capture of the first and second images is accounted for.

The proposed multispectral microscope system may comprise additional detector elements, each additional detector element being configured to capture an additional image of the sample in an additional spectral channel. The processor is configured to determine the spatial correlation between all images based on a spectral crosstalk between all spectral channels and to register all images based on the spatial correlation. In particular, the processor is configured to determine the spatial correlation between all images by determining a pairwise spatial correlation between two of the images based on a spectral crosstalk between their respective spectral channels for all possible pairings of the images.

Preferably, the spatial correlation is a mutual information or a cross correlation, in particular a phase correlation, between the first and second images.

The transformation that registers both images to each other is the transformation that optimizes the respective correlation measure.

The phase correlation between two images is a type of cross correlation that can in particular be used to determine a translation (shift) between the two images. The Fourier transform of the phase correlation of two images $I_0$, $I_1$ is calculated as $$\tilde{P} = \frac{\tilde{I}_0 \cdot \tilde{I}_1^*}{|\tilde{I}_0 \cdot \tilde{I}_1^*|},$$

where the tilde denotes the Fourier transform. The phase correlation P has a maximum for the shift value where the maximum correlation of structure is located, e.g. at pixel position (0, 0) if the images are perfectly registered, and at pixel position (1, 0) if the images are offset by one pixel in the x-direction. The Fourier transform can easily be computed by FFT methods and multiplication and division in the Fourier domain are computed on a per-pixel level.

Typically, drift due to thermal expansion causes a misalignment between the first and second detector elements of only a small number of pixels. It is therefore justified to assume that the maximum of the phase correlation P is close to pixel position (0,0). Thus, only a small patch of limited size around pixel position (0, 0) of the phase correlation has to be evaluated. For this, a good estimate of the maximum position is found by computing the center of mass of the phase correlation. This can be further refined by fitting a function, e.g. a two-dimensional Gaussian, to the data. The maximum of the fitted function then corresponds to the maximum of the phase correlation. Thereby, a sub-pixel registration is possible.

In a preferred embodiment, the processor is configured to determine at least one transformation parameter based on the spatial correlation in order to register the first and second images, in particular a translation parameter, a rotation parameter, and/or scaling parameter. From these parameters a linear transformation is computed that registers the first and second images. Linear transformation can be performed fast, thus providing a fast way of registering the first and second images.

Further, the parameter may be stored in a memory element for registering subsequently captured first and second images. This eliminates the need for subsequent determination of the spatial correlation, in particular once it has been determined that no further drift can occur, e.g. because the microscope system has reached its desired operating temperature.

In another preferred embodiment, the processor is configured to perform a coarse image registration of the first and second images based on a predetermined transformation in order to generate coarsely registered first and second images, and to determine the spatial correlation based on the coarsely registered first and second images. In this embodiment, predetermined transformation is determined by an explicit calibration, e.g. during manufacturing. The coarse registration is used in order to counteract a misalignment of the first and second detector elements due to manufacturing and/or transport of the microscope system. Performing a coarse registering before performing the registration based on the spatial correlation reduces the overall computational load making the overall image registration faster and more efficient.

In another preferred embodiment, the processor is configured to perform the determination of the spatial correlation and the registration of the first and second images according to a predetermined time schedule. Drift due to thermal expansion occurs on a time scale that may be much larger than the period between subsequently capturing the first and second images. It is therefore sufficient to perform the necessary steps for image registration periodically rather than with every capture of the first and second images. This makes the overall image registration process faster and more efficient by skipping unnecessary steps.

In another preferred embodiment, the multispectral microscope system comprises at least one sensor element. The processor is configured to perform the determination of the spatial correlation and the registration of the first and second images according to a sensor input from the sensor element. Preferably, the sensor element is a temperature sensor. Moreover, other sensor types may be used, such as a motion sensor configured to determine if the microscope system has moved. In this embodiment the processor performs the necessary steps for image registration when it receives a sensor input from the sensor element that corresponds to a change of state of the microscope, e.g. a significant temperature change, a movement that might indicate that drift has occurred, etc. This way, the necessary steps for image registration are only performed if it is plausible to assume that drift has occurred. Thereby, unnecessary steps are skipped and the efficiency of the image registration process is increased.

In another preferred embodiment the multispectral microscope system is a fluorescence microscope system. In this embodiment, the microscope system can be used for multispectral fluorescence microscopy, i.e. fluorescence microscopy using fluorophores with different emission spectra.

In another preferred embodiment, the processor is configured to perform spectral unmixing on the registered first and second images. In multispectral fluorescence microscopy emission crosstalk between different fluorophores, i.e. an overlap between the different emission spectra, leads to difficulties in identifying the precise localizations of different fluorophores. Spectral unmixing is a computational approach to solving this problem.

In another preferred embodiment, the processor is configured to correct a first optical distortion in the first image in order to generate a first distortion corrected image, to correct a second optical distortion in the second image in order to generate a second distortion corrected image, and to determine the spatial correlation based on the first and second distortion corrected images. This is done in order to counteract known or predetermined aberrations caused by an optical system of the multispectral microscope system. Aberrations introduce non-linear distortions into the first and second images that make it harder to determine the transformation needed for registering the images. Thus, by correcting the first and second optical distortions the image registration process is made faster.

In another preferred embodiment, the processor is configured to correct the first and second optical distortion based on at least one predetermined optical parameter of the microscope system. The optical parameter may be determined during manufacturing, e.g. by measurement and/or optical computation.

In another preferred embodiment, the processor is configured to determine an image quality of the first and second images based on the spatial correlation. For example, the width of the two-dimensional Gaussian used to find the maximum of the phase correlation may be used in order to determine whether the image data is trustworthy or not.

In another preferred embodiment, the multispectral microscope system comprises a beam splitter arrangement configured to direct first light having a first wavelength spectrum onto the first detector element in order to define the first spectral channel, and to direct second light having a second wavelength spectrum onto the second detector element in order to define the second spectral channel. The beam splitter arrangement may further be configured to direct excitation light onto the sample for exciting fluorophores therein. The beam splitter arrangement may comprise any number of optical elements, in particular prisms, beam splitter elements, optical relay systems and mirrors.

In another preferred embodiment, the multispectral microscope system comprises a mechanical connection element mechanically connecting the first and second detector elements. In particular, the mechanical connection element comprises a baseplate element. Having the first and second detector elements mounted on a single mechanical connection element reduces overall drift. In particular, it ensures that the main contribution to the drift is due to thermal expansion of the mechanical connection element. This means, the main contribution to drift is a translation which is counteracted by a simple linear transformation in order the register the first and second images.

The invention further relates to a method for registering first and second images by means of a multispectral microscope. The method comprises the following steps: capturing a first image of a sample in a first spectral channel, capturing a second image of the sample in a second spectral channel. Determining a spatial correlation between the first and second images based on a spectral crosstalk between the first and second spectral channels, and registering the first and second images based on the spatial correlation.

FIG. 1 is a schematic diagram of a multispectral microscope system 100. The microscope system 100 is configured to capture a multispectral image of a sample 102.

The microscope system 100 comprises an excitation light source 104. The excitation light source 104 emits excitation light 106 for exciting fluorophores within the sample 102. Thus, the microscope system 100 is a fluorescence microscope system. In this particular embodiment, the excitation light source 104 is a coherent light source.

The microscope system 100 also comprises an objective 108 facing the sample 102. The objective 108 is configured to capture detection light emitted by the sample 102, in particular fluorescence light emitted by the fluorophores within the sample 102. In this particular embodiment, the objective 108 in combination with the microscope system has an image-side numerical aperture of around 0.05, i.e. the microscope system 100 is a widefield microscope or a lightsheet microscope.

The objective 108 directs the captured detection light towards a beam splitter arrangement 112 along a detection light path 110. The beam splitter arrangement 112 is configured to split the detection light path 110 into first and second spectral channels 114, 116. In order to create the first and second spectral channels 114, 116, the beam splitter arrangement 112 separates the detection light spectrally into first light having a first wavelength spectrum and second light having a second wavelength spectrum. Further, the beam splitter arrangement 112 may be configured to direct the excitation light 104 onto the sample 102 via the objective 108. The beam splitter arrangement 112 may comprise a number of optical elements such as prisms, beam splitters, in particular dichroitic elements, and mirrors.

A first detector array 118, e.g. a CMOS element, is arranged in the first spectral channel 114. The first detector array 118 is configured to capture a first 2D image of the sample 102 in the first wavelength spectrum. A second detector array 120 is arranged in the second spectral channel 116. The second detector array 120 is configured to capture a second 2D image of the sample 102 in the second wavelength spectrum. The first and second detector arrays 118, 120 may be mounted on a single base plate 122 which constitutes a mechanical connection element.

In this particular embodiment, the base plate 122 has a width of around 20 cm to 30 cm, while a single pixel of the detector arrays 118, 120 has a width of around 3.5 µm. Thus, thermal expansion of the base plate 122 within the temperature range of normal microscope operation may shift a single pixel measurably and thus introduce drift. Therefore, the microscope system 100 comprises a temperature sensor 124 arranged at the base plate 122. The temperature sensor 124 is configured to measure the temperature of the base plate 122 and/or the temperature of an installation space 126 of the base plate 122 and the detector arrays 118, 120.

The microscope system 100 further comprises a processor 128 which is configured to control the overall operation of the microscope system 100. The processor 128 comprises a memory element 130 and is connected to the first and second detector arrays 118, 120, the temperature sensor 124, and the excitation light source 104.

The processor 128 is further configured to receive the first and second images captured by the first and second detector arrays 118, 120 and to register the images. A first coarse registration may be performed based on a coarse transformation stored in the memory element 130. The coarse transformation is e.g. determined during manufacturing. A second finer registration may be performed based on a spatial correlation between the first and second images.

The spatial correlation is determined by the processor 128 based on the first and second images. In particular, a fine transformation for transforming the first and second images into a common coordinate system, i.e. registering the first and second images, is determined by the processor 128 based on the spatial correlation. The spatial correlation and the fine transformation based thereof are determined with each capturing of the first and second images. Alternatively, the spatial correlation and fine transformation based thereon may be determined according to a schedule, that is either predetermined or set by a user input, or according to a sensor input from the temperature sensor 124. If the fine transformation is not determined with each capturing, the fine transformation is stored in the memory element 130 for use in subsequent image registrations. The image registration of the first and second images will be described in more detail in connection with FIG. 2 below.

The processor 128 or another processor is also configured to perform a spectral unmixing of the first and second images, in order to decompose the spectrum of individual pixels of the images into its constituent spectra corresponding to emission spectra of the fluorophores within the sample 102.

Further, the processor 128 or another processor is configured to correct optical distortions in the first and second images in order to generate distortion corrected images. The optical distortions are due to the imperfect nature and manufacturing tolerances of a real optical system such as the optical system of the microscope system 100 comprising of the objective 108 and the beam splitter arrangement 112. The processor 128 corrects these optical distortions based on optical parameters stored in the memory element 130. These optical parameters are determined by an optical simulation and/or by measurement during manufacturing of the microscope system 100.

Figure 2:
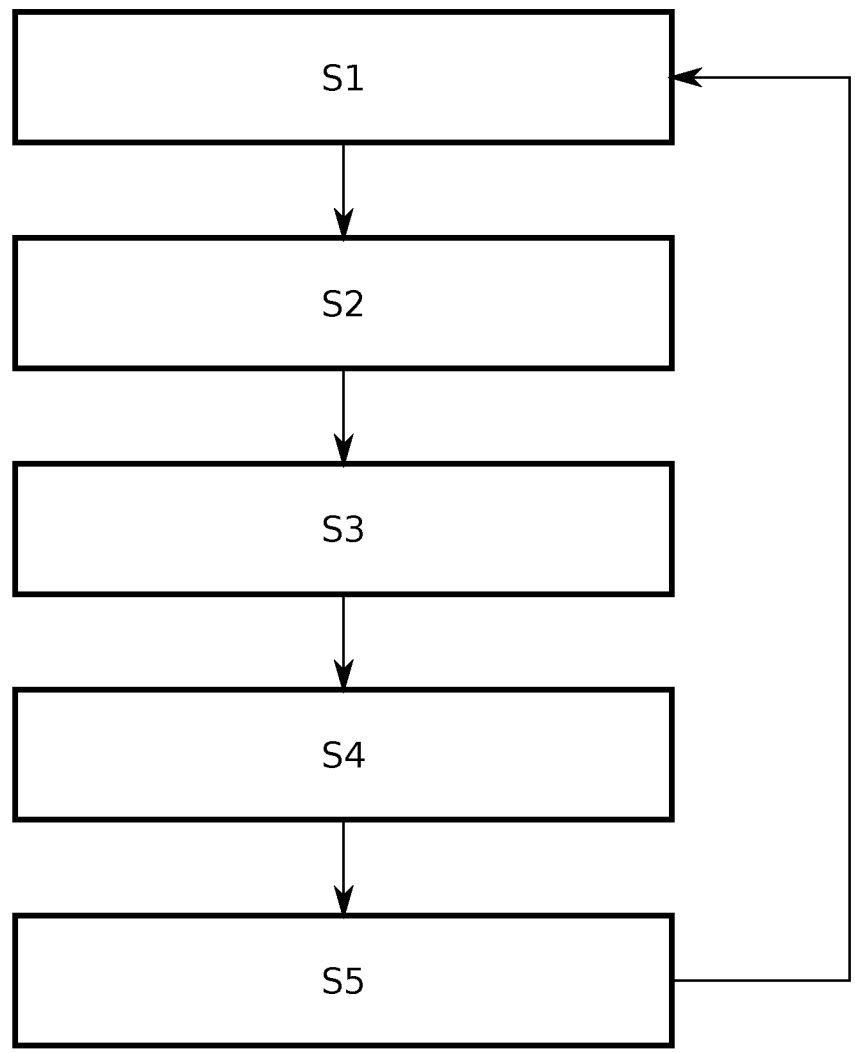
FIG. 2 is a flowchart of a method for registering images by means of the multispectral microscope system.

FIG. 2 is a flowchart of a method for registering images by means of the multispectral microscope system 100 described in connection with FIG. 1.

In Step S1, the first and second images are captured by the first and second detector arrays 118, 120. The corresponding image data is transmitted to the processor 128. In step S2, the processor 128 corrects optical distortions in the first and second images based on the optical parameters stored in the memory element 130. In particular, the processor 128 corrects a first optical distortion in the first image in order to generate a first distortion corrected image and a second optical distortion in the second image in order to generate a second distortion corrected image.

Subsequently, in step S3, the processor 128 performs the first coarse image registration based on the coarse transformation stored in the memory element 130 in order to coarsely align the first and second distortion corrected images in a common coordinate system. In step S4, the spatial correlation between the first and second distortion corrected images is determined by the processor 128.

In particular, the spatial correlation may be a phase correlation between the first and second distortion corrected images. The phase correlation is used to determine the translation relating the first and second distortion corrected images. The translation represents the fine transformation that transforms the corrected images into the common coordinate system. In other words, the fine transformation determined from the phase relation can be used to finely align the first and second distortion corrected images in the common coordinate system. However, the spatial correlation may also be any cross correlation, a mutual information, or any other observable measuring the mutual dependence of the information contained in the first and second images and/or first and second distortion corrected images. From these observables a number of fine transformations for transforming the first and second images and/or the first and second distortion corrected images into the common coordinate system may be determined. In any case, the resulting fine transformation is then stored in the memory element 130. The steps S3 and S4 may be performed in any order or even in parallel.

In step S5, the fine transformation stored in the memory element 130 is used to finely align the first and second distortion corrected images. This results in a registered multispectral image of the sample 102. The steps S1 to S5 are then repeated in order to generate subsequent multispectral images of the sample 102.

In subsequent iterations of the method, step S4 may be omitted. Whether or not step S4 is performed may be determined by a schedule, i.e. step S4 is performed only if a predetermined interval has passed since step S4 was last performed. This ensures that the spatial correlation and the fine transformation are only calculated if an interval has passed in which the state of the microscope system 100 has changed significantly, making further adjustments necessary. Alternatively or additionally, whether step S4 is performed may be determined by a sensor input from the temperature sensor 124. For this, every time the fine transformation is determined, the sensor input, i.e. temperature of the base plate 122 and/or the installation space 126, is stored in the memory element 130. Whenever it is determined that the temperature measured has changed significantly from the temperature stored in the memory element 130, a flag is set that step S4 is to be performed. Thus, that the spatial correlation and the fine transformation are only calculated if necessary.

Although the embodiment of the multispectral microscope 100 described above comprises only two detector arrays 118, 120, it is noted, that the multispectral microscope system 100 may comprise any number of additional detector arrays. Each additional detector element is configured to capture an additional image of the sample in an additional spectral channel. Likewise, the method may be easily adapted for registering more than two images, by e.g. performing the steps S2 to S5 for every pair of images.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Microscope system
102 Sample
104 Light source
106 Light
108 Objective
110 Light path 112 Beam splitter arrangement
114, 116 Spectral channel
118, 120 Detector element
122 Mechanical connection element
124 Sensor
126 Installation space
128 Processor
130 Memory element

What is claimed is:

1. A multispectral microscope system, comprising:
a base plate;
a first detector element comprising a first detector array and configured to capture a first image of a sample in a first spectral channel;
at least a second detector element comprising a second detector array different from the first detector array and configured to capture a second image of the sample in a second spectral channel, wherein the first detector element and the second detector element are mounted on the base plate and are offset from each other with a distance; and
a processor configured to determine a spatial correlation between the first and second images based on a spectral crosstalk between the first and second spectral channels, and to register the first and second images based on the spatial correlation, so as to compensate for a change of the distance between the first detector element and the second detector element caused by thermal expansion of the base plate.

2. The microscope system of claim 1, wherein the spatial correlation comprises a mutual information or a cross correlation between the first and second images.

3. The microscope system of claim 1, wherein the processor is configured to determine at least one transformation parameter based on the spatial correlation in order to register the first and second images.

4. The microscope system of claim 1, wherein the processor is configured to perform a coarse image registration of the first and second images based on a predetermined transformation in order to generate coarsely registered first and second images, and to determine the spatial correlation based on the coarsely registered first and second images.

5. The microscope system of claim 1, wherein the processor is configured to perform the determination of the spatial correlation and the registration of the first and second images according to a predetermined time schedule.

6. The microscope system of claim 1, further comprising:
at least one sensor element,
wherein the processor is configured to perform the determination of the spatial correlation and the registration of the first and second images according to a sensor input from the at least one sensor element.

7. The microscope system of claim 6, wherein the at least one sensor element comprises a temperature sensor.

8. The microscope system of claim 1, wherein the multispectral microscope system comprises a fluorescence microscope system.

9. The microscope system of claim 1, wherein the processor is configured to perform spectral unmixing on the registered first and second images.

10. The microscope system of claim 1, wherein the processor is configured to correct a first optical distortion in the first image in order to generate a first distortion corrected image, to correct a second optical distortion in the second image in order to generate a second distortion corrected image, and to determine the spatial correlation based on the first and second distortion corrected images.

11. The microscope system of claim 10, wherein the processor is configured to correct the first and second optical distortions based on at least one predetermined optical parameter of the microscope system.

12. The microscope system of claim 1, wherein the processor is configured to determine an image quality of the first and second images based on the spatial correlation.

13. The microscope system of claim 1, further comprising:
a beam splitter arrangement configured to direct first light having a first wavelength spectrum onto the first detector element in order to define the first spectral channel, and to direct second light having a second wavelength spectrum onto the second detector element in order to define the second spectral channel.

14. A method for registering first and second images by a multispectral microscope, the method comprising:
capturing a first image of a sample in a first spectral channel using a first detector element comprising a first detector array;
capturing a second image of the sample in a second spectral channel using a second detector element comprising a second detector array different from the first detector array, wherein the first detector element and the second detector element are mounted on a base plate and are offset from each other with a distance;
determining a spatial correlation between the first and second images based on a spectral crosstalk between the first and second spectral channels; and
registering the first and second images based on the spatial correlation, so as to compensate for a change of the distance between the first detector element and the second detector element caused by thermal expansion of the base plate.

15. The microscope system of claim 1, wherein the spatial correlation comprises a phase correlation between the first and second images.

16. The microscope system of claim 15, wherein the determining the spatial correlation between the first and second images comprises determining a Fourier transform of the phase correlation between the first and second images.

17. The method of claim 14, wherein the spatial correlation comprises a phase correlation between the first and second images.

18. The method of claim 17, wherein the determining the spatial correlation between the first and second images comprises determining a Fourier transform of the phase correlation between the first and second images.

* * * * *